June 24, 1930.  P. BURKE  1,767,576
POWER SHOVEL
Filed April 5, 1929  2 Sheets-Sheet 1

INVENTOR.
Paul Burke
BY
ATTORNEYS.

June 24, 1930.  P. BURKE  1,767,576
POWER SHOVEL
Filed April 5, 1929   2 Sheets-Sheet 2

INVENTOR.
Paul Burke
BY
ATTORNEYS.

Patented June 24, 1930

1,767,576

UNITED STATES PATENT OFFICE

PAUL BURKE, OF GREEN BAY, WISCONSIN, ASSIGNOR TO NORTHWEST ENGINEERING CORPORATION, OF GREEN BAY, WISCONSIN, A CORPORATION OF WISCONSIN

POWER SHOVEL

Application filed April 5, 1929. Serial No. 352,694.

The invention relates to power shovels.

The object of the invention is to provide a power shovel of the rope-thrust type in which not only is the thrusting effort of the hoisting cable used during digging but additional thrusting effort is available for projecting the dipper stick outwardly beyond the boom for dumping and also for imparting a rapid longitudinal shaking movement to the dipper stick to dislodge rock or other objects with which the dipper and its teeth may have picked up during the digging operation. One form of shovel for carrying these objects into effect is shown and described in my prior United States Patent No. 1,536,609, of May 5, 1925, and the present invention is a further development therefrom wherein the arrangement of the cables and drums has been simplified over that shown in the aforementioned patent. According to the present invention the cable for giving additional crowding and the back haul cable are mounted on the same drum and a simple arrangement of drive connection between this drum and the main hoist drum shaft with controls permits this drum to be driven in either direction while utilizing the control elements of the usual two-drum machine.

The invention further consists in the several features hereinafter set forth and more particularly defined by claims at the conclusion hereof.

In the drawings Fig. 1 is a side elevation view of an excavating shovel embodying the invention;

Fig. 3 is a detail rear view of the upper end of the dipper handle.

Figure 1:
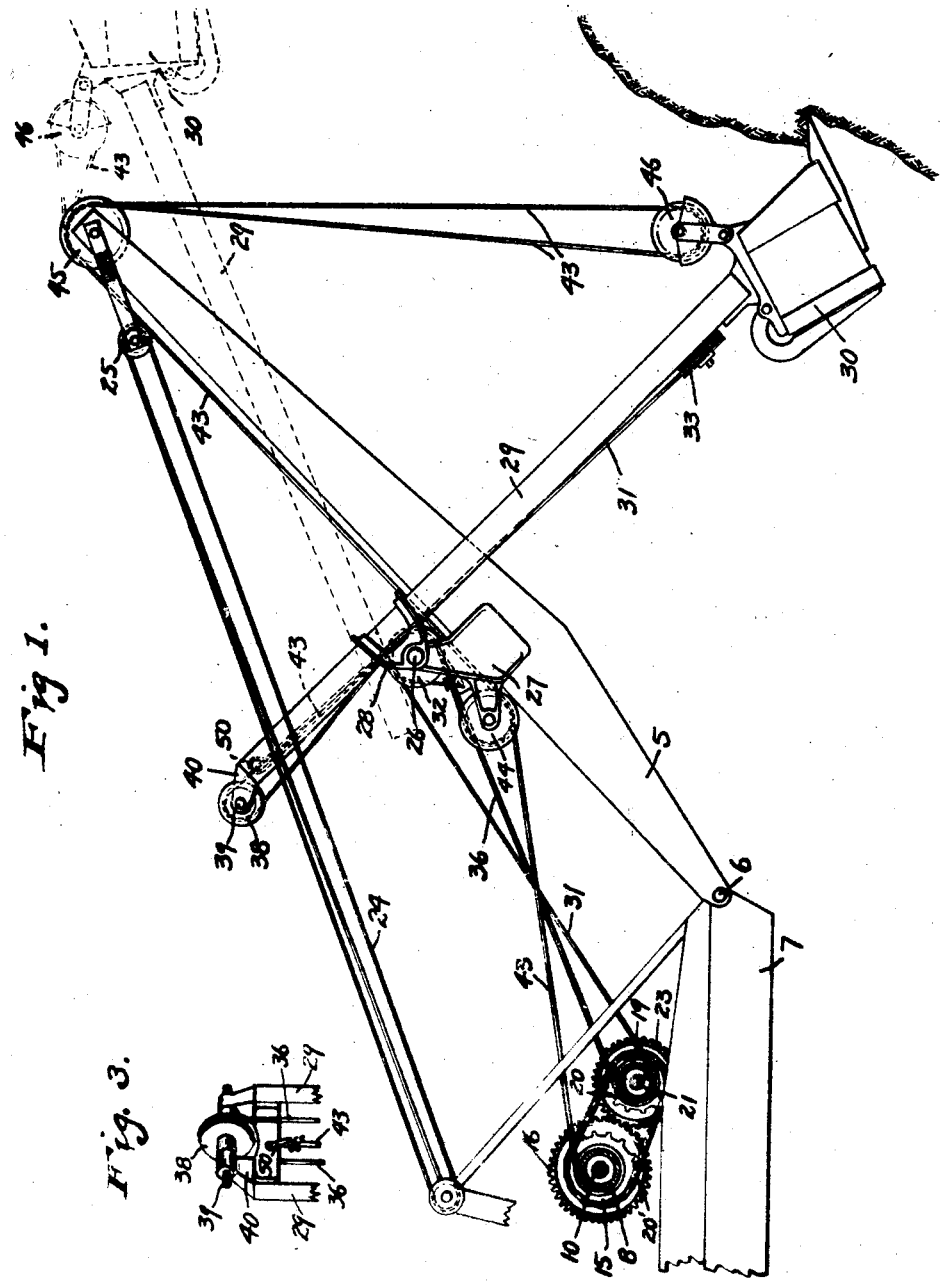
Figure 2:
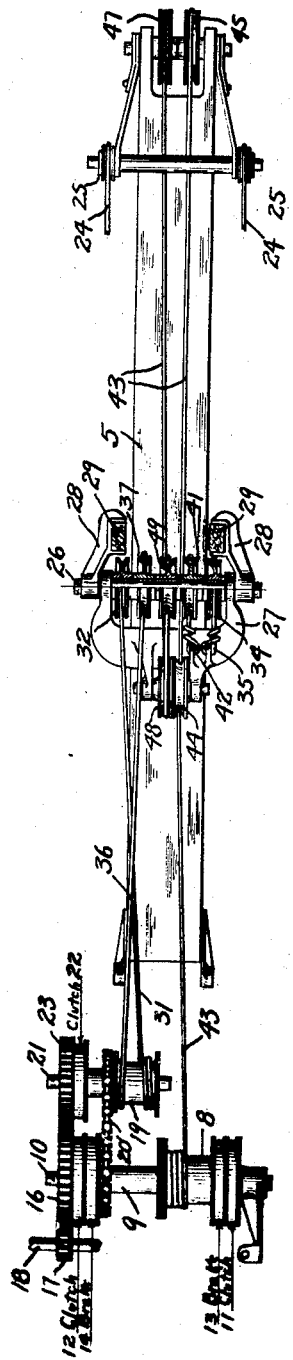
Fig. 2 is a plan view thereof, parts being shown in section.

In the drawings the numeral 5 designates the boom, which may be of any suitable construction, vertically, pivotally attached, as at 6, to the rotating base 7 of the machine, which base is of well-known construction. The drums 8 and 9 may be of any well-known construction and are loose on a shaft 10 to which they are adapted to be drivingly connected by clutches 11 and 12 of any suitable construction and said drums are also equipped with brakes 13 and 14 of any suitable construction to control their operation. The drum 9 is not used as a cable winding drum in the present instance, but is so used, with proper rope lagging, in the usual two-drum rope-thrusting shovel and is retained herein, unlagged, for the sake of simplicity in production and is used as a power transmitting member having a sprocket wheel 15 mounted thereon.

The shaft 10 carries a gear 16 in mesh with a drive pinion 17 on a shaft 18, which is driven by any suitable source of power.

A cable drum structure 19 having a sprocket wheel 20 thereon, connected by chain 20' with the sprocket 15, is loosely mounted on a shaft 21 and equipped with a clutch 22 to connect it with a gear 23 fast on said shaft and meshing with the gear 16 so that when the clutch 22 is engaged said front cable drum will rotate in the opposite direction from the main drum shaft 10. When, however, the clutch 12 is engaged and clutch 22 is out, the front drum 19 will be driven through the sprockets 15, 20 and chain 20' in the same direction as the shaft 10. Thus means are provided for imparting a reversible drive to the drum 19.

The boom 5 is adapted to be raised or lowered and held in various positions of vertical adjustment by any well-known means, such as cables 24 connecting pulleys 25 supported from the outer end of the boom to parts on the rotating base.

A shipper shaft 26 is secured to the spaced arms of casting 27 on the boom and the saddle blocks or handle guides 28 are loose on said shaft. The dipper handle or stick 29 is preferably of the divided type, that is, composed of two sections, each being slidably mounted in its respective saddle block and adapted to swing therewith about the shaft 26 and carries a dipper or shovel 30 of any suitable construction at its lower end.

The back haul cable 31 is dead ended on the drum 19 and passes therefrom over a sheave 32 on the shipper shaft 26, thence to and around a sheave 33 at the lower end of the dipper stick and thence back over a dead sheave 34 on the shaft 26 to a dead end connection at 35 on the boom.

The thrusting cable 36 is also dead ended on the drum 19 and passes under shipper shaft sheave 37, thence to the dipper stick cap sheave 38, journalled on a shaft 39 carried by a cap member 40 connecting the two sections of the stick, from which sheave it passes under a sheave 41 on the shaft 26 and thence to a dead end on the boom at 42. The thrusting and hoisting cable 43 passes from the drum 8 under guide sheave 44, over right-hand boom point sheave 45 to and around dipper padlock sheave 46, thence back over left-hand boom point sheave 47 down to guide sheave 48, thence to sheave 49 on the shipper shaft 26 and upwardly therefrom to its dead end at 50 at the inner end of the dipper stick.

With this construction when the drum 19 is prevented from turning by application of the brake 14, thereby holding cables 31 and 36, and the cable 43 is pulled in by winding it up on drum 8, the dipper moves approximately in the arc of a circle of which the shipper shaft is the center. The dipper having been drawn in toward the machine and lowered upon the material to be excavated and with the brake 14 on the member 9 having been released to allow cable 31 to pay out, cable 43 is wound in, causing the dipper stick to swing relative to its pivot on the shipper shaft and at the same time shift outwardly with respect to the boom through the saddle blocks by reason of the pulling effect exerted on the upper end of the dipper stick by that portion of the hoisting cable which extends from the sheave 49 to the upper end of the dipper stick, it being noted that this run of the cable is shortened as the hoisting cable is pulled in. This outward shifting of the stick crowds the dipper outwardly into the material to be excavated. If during this digging operation it is desired to increase the outward thrusting force, the clutch 22 is thrown in, thereby connecting the drum 19 with the power source through the gear 23 and the cable 36 is wound in, causing its bight over the sheave 38 to pull downwardly upon the upper end of the dipper stick as the effective length of the cable between the sheaves 38 and 37 shortens, to effect the increase in outward thrusting effort.

Furthermore, as the dipper under the action of the hoisting cable 43 is swung upwardly beyond a substantially horizontal position, the tendency of the stick and dipper to shift inwardly, due to the tension in said hoist cable and the weight of the dipper and its stick, may be prevented by applying the brake 14, or it may be counteracted and the dipper thrust further out by the connection drum 19 has with the source of power through the throwing in of the clutch 22 so that the cable 36 will operate to move a relatively long stick outwardly after it is raised so that the dipper will be moved to a point beyond the upper end of the boom in position for dumping its load. The backward movement of the dipper stick is effected through the engagement of clutch 12 and the drive through sprockets 15, 23 and chain 20' to drum 19, which then rotates to wind up the back haul cable 31 and pay out the thrust cable 36.

As the outward motion of the dipper stick is instantly available through the engagement of clutch 22 and the backward movement of the dipper stick is instantly available through the engagement of clutch 12, rapid alternate engagements or disengagements of these two clutches will necessarily impart a longitudinal shaking movement to the dipper stick, effective in dislodging sticky material, rock or other objects which may be contained in the dipper.

I desire it to be understood that this invention is not to be limited to any specific form or arrangement of parts except in so far as such limitations are specified in the claims.

What I claim as my invention is:

1. In an excavating machine, the combination with a supporting boom, of a dipper and dipper handle mounted thereon for swinging and shifting movements relative thereto, a hoisting drum, a hoisting and thrusting cable mounted on said drum and associated with the dipper and its handle for hoisting the dipper and crowding it outwardly into the material to be excavated, a single cable-winding means, a back-haul cable associated with said cable-winding means and with the dipper and dipper handle for retracting the dipper, a thrust cable also associated with said cable-winding means for moving the dipper and its handle outwardly, and separately controlled reversible drive means for said cable-winding means.

2. In an excavating machine, the combination with a supporting boom, of a dipper and dipper handle mounted thereon for swinging and shifting movements relative thereto, a drum shaft, a hoisting drum mounted on said shaft, a hoisting and thrusting cable mounted on said drum and associated with the dipper and its handle for hoisting the dipper and crowding it outwardly into the material to be excavated, a second drum, means for reversibly driving said second drum from said driven shaft, control means for said reversible drive means, a back-haul cable mounted on said second drum and associated with the dipper and dipper handle for retracting the dipper, and a third cable mounted on said second drum for moving the dipper and its handle outwardly in conjunction with the hoisting cable.

3. In an excavating machine, the combination with a supporting boom, of a dipper and dipper handle mounted thereon for swinging and shifting movements relative thereto, a driven shaft, a hoisting drum mounted on said shaft, a clutch for connecting said drum with said shaft, a hoisting and thrusting cable mounted on said drum and associated with the dipper and dipper handle for hoisting the dipper and crowding it outwardly into the material to be excavated, a member mounted on said driven shaft, a clutch for connecting said member with said shaft, a second drum, a straight drive connection between said second drum and said member, a clutch-controlled reverse drive connection between said second drum and said driven shaft, a back-haul cable mounted on said second drum and associated with the dipper and its handle for retracting the dipper, and a third cable mounted on said second drum for moving the dipper and its handle outwardly.

4. In an excavating machine, the combination with a supporting boom, of a dipper and dipper handle mounted thereon for swinging and shifting movements relative thereto, a driven shaft, a hoisting drum mounted on said shaft, a hoisting and thrusting cable mounted on said drum and associated with the dipper and dipper handle for hoisting the dipper and crowding it outwardly into the material to be excavated, a member mounted on said driven shaft, a clutch for connecting said member with said shaft, a second drum, a chain and sprocket connection between said member and said second drum, a clutch-controlled reverse gear drive connection between said driven shaft and said second drum, a back-haul cable mounted on said second drum and associated with the dipper and its handle for retracting the dipper, and a third cable mounted on said second drum for moving the dipper and its handle outwardly.

5. In a rope-thrusting shovel, the combination with a supporting boom, of a dipper and dipper handle mounted thereon for swinging and shifting movements relative thereto, of a shipper shaft having sheaves mounted thereon, a hoisting drum, a hoisting-and-thrusting cable extending from said drum to the end of the boom with a bight connected to the dipper, thence back to the end of the boom and to one of the sheaves on said shipper shaft and thence to a thrust connection with the inner end of the dipper handle, a second drum, a back-haul cable extending from said drum over another sheave on said shipper shaft and thence to a thrust connection with the outer end of the dipper handle for retracting the dipper, a third cable extending from said second drum to another sheave on said shipper shaft and having a bight in end thrust association with the inner end of the dipper handle, means for driving said second-named drum in either direction, and separately controlled means for controlling said drums.

6. In an excavating machine, the combination with a supporting boom, of a dipper and dipper handle mounted thereon for swinging and shifting movements relative thereto, a driven shaft, a hoisting drum mounted on said shaft, a hoisting cable mounted on said drum and associated with the dipper and dipper handle, a member mounted on said driven shaft, a clutch for connecting said member with said shaft, a second drum, a chain and sprocket connection between said member and said second drum, a clutch-controlled reverse gear drive connection between said driven shaft and second drum, a back-haul cable mounted on said second drum and associated with the dipper and its handle for retracting the dipper, and a third cable mounted on said second drum for moving the dipper and its handle outwardly.

In testimony whereof, I affix my signature.
PAUL BURKE.